US008979101B2

(12) United States Patent
Primiano

(10) Patent No.: US 8,979,101 B2
(45) Date of Patent: Mar. 17, 2015

(54) BARREL COOLER WITH COMPONENTS ASSEMBLEABLE ON SITE

(71) Applicant: The Coca-Cola Company, Atlanta, GA (US)

(72) Inventor: Bernard Primiano, Norcross, GA (US)

(73) Assignee: The Coca-Cola Company, Atlanta, GA (US)

( * ) Notice: Subject to any disclaimer, the term of this patent is extended or adjusted under 35 U.S.C. 154(b) by 67 days.

(21) Appl. No.: 13/657,998

(22) Filed: Oct. 23, 2012

(65) Prior Publication Data

US 2014/0110912 A1 Apr. 24, 2014

(51) Int. Cl.
  *B62B 1/12* (2006.01)
  *B62B 3/00* (2006.01)
  *B65D 81/38* (2006.01)
  *B65D 8/00* (2006.01)
  *B65D 6/00* (2006.01)
  *B65D 43/16* (2006.01)

(52) U.S. Cl.
  CPC . *B62B 3/00* (2013.01); *B65D 11/06* (2013.01); *B65D 11/20* (2013.01); *B65D 43/163* (2013.01); *B65D 81/3806* (2013.01)
  USPC .................. 280/79.5; 220/592.09; 220/592.03

(58) Field of Classification Search
  CPC ............... B62B 3/00; F25D 3/02; F25D 3/06; F25D 3/063
  USPC ........... 280/79.5; 220/592.19, 592.09, 592.03
  See application file for complete search history.

(56) References Cited

U.S. PATENT DOCUMENTS

| 2,792,692 | A | * | 5/1957 | Bryan | 62/306 |
| 3,308,636 | A | * | 3/1967 | Schaaf | 62/400 |
| 3,491,548 | A | * | 1/1970 | Christiansen | 62/255 |
| 3,789,622 | A | * | 2/1974 | Yanes | 62/396 |
| 4,071,160 | A | * | 1/1978 | Vick | 220/592.2 |
| 4,164,853 | A | * | 8/1979 | McDonough | 62/457.1 |
| 4,461,943 | A | * | 7/1984 | Beauvais | 219/93 |
| 4,481,791 | A | * | 11/1984 | German | 62/400 |
| 4,514,993 | A | * | 5/1985 | Johnson | 62/372 |
| 4,519,219 | A | * | 5/1985 | Prepodnik et al. | 62/457.1 |
| 4,633,678 | A | * | 1/1987 | Lea et al. | 62/457.1 |
| 4,642,999 | A | * | 2/1987 | Justice | 62/440 |
| 4,714,158 | A |   | 12/1987 | Oltman et al. | |
| 4,874,106 | A |   | 10/1989 | Robbins, III | |
| 4,946,032 | A | * | 8/1990 | Stoddard et al. | 62/457.1 |
| 5,048,171 | A | * | 9/1991 | Bidwell et al. | 29/401.1 |
| 5,203,181 | A | * | 4/1993 | Brossia et al. | 62/372 |

(Continued)

FOREIGN PATENT DOCUMENTS

WO 2011/150414 A1 12/2011

*Primary Examiner* — Jeffrey J Restifo
(74) *Attorney, Agent, or Firm* — Sutherland Asbill & Brennan LLP

(57) ABSTRACT

A sidewall panel of a barrel cooler has a sidewall panel body forming a first vertical edge and a second vertical edge. The sidewall panel has a latch arm protruding from the first vertical edge of the sidewall panel body, wherein the latch arm is adapted to cooperatively connect with a latch box of a first adjacent sidewall panel of the barrel cooler. The sidewall panel also has a latch box flush along the second vertical edge of the sidewall panel body, wherein the latch box is adapted to cooperatively connect with a latch arm of a second adjacent sidewall panel of the barrel cooler. The sidewall panel may be included in a system of parts that are adapted to cooperatively couple together to form a barrel cooler. The sidewall panel may also be included in an assembled barrel cooler.

20 Claims, 6 Drawing Sheets

(56) References Cited

U.S. PATENT DOCUMENTS

| | | | |
|---|---|---|---|
| 5,456,357 A * | 10/1995 | Wenner et al. | 206/372 |
| 5,906,290 A * | 5/1999 | Haberkorn | 220/505 |
| 6,397,624 B1 * | 6/2002 | Horwell | 62/457.8 |
| 6,481,238 B1 * | 11/2002 | Jennings et al. | 62/457.4 |
| 6,729,758 B1 * | 5/2004 | Carter | 383/103 |
| 7,249,772 B2 * | 7/2007 | Bruns | 280/47.34 |
| 8,146,764 B2 * | 4/2012 | Kral | 220/8 |
| 8,215,125 B2 * | 7/2012 | Linder | 62/457.2 |
| D666,048 S * | 8/2012 | Kasswran et al. | D7/301 |
| 2002/0085995 A1 | 7/2002 | Moore et al. | |
| 2006/0017245 A1 * | 1/2006 | Bruns | 280/47.26 |
| 2006/0273083 A1 | 12/2006 | Lev | |
| 2007/0145051 A1 * | 6/2007 | Uffner et al. | 220/4.28 |
| 2009/0211529 A1 | 8/2009 | Manley-Hood | |

\* cited by examiner

BARREL COOLER WITH COMPONENTS ASSEMBLEABLE ON SITE

TECHNICAL FIELD

This application pertains generally to coolers, and, more particularly, to barrel coolers with components that are shipped unassembled and easily assembled on site.

BACKGROUND

Both stationary and movable coolers are widely used for cooling food items and beverages. Ice is often used in movable coolers because ice is readily available, cools effectively, and allows a high degree of variability in the placement of the cooler. A popular movable cooler is a barrel cooler that can be disposed at one desirable area in a retail environment and easily wheeled to another area in the same retail environment as desired. However, transportation costs typically increase with the bulk of the item being transported. Therefore, when moving the barrel cooler longer distances, the bulkiness of a traditional barrel cooler typically results in high transportation costs.

SUMMARY

According to one aspect of the disclosure, a sidewall panel of a barrel cooler is provided. The sidewall panel comprises a sidewall panel body forming a first vertical edge and a second vertical edge. The sidewall panel also comprises a latch arm protruding from the first vertical edge of the sidewall panel body, wherein the latch arm is adapted to cooperatively connect with a latch box of a first adjacent sidewall panel of the barrel cooler. The sidewall panel further comprises a latch box flush along the second vertical edge of the sidewall panel body, wherein the latch box is adapted to cooperatively connect with a latch arm of a second adjacent sidewall panel of the barrel cooler.

In some aspects of the disclosure, the latch arm comprises an indent adjacent to a distal end of the latch arm.

In some aspects of the disclosure, the indent of the latch arm is shaped to cooperatively engage a corresponding ridge of the latch box of the first adjacent sidewall panel.

In some aspects of the disclosure, the latch arm further comprises a sloped end that is adapted to facilitate flexing of the latch arm up and over the corresponding ridge.

In some aspects of the disclosure, the first adjacent sidewall panel and the second adjacent sidewall panels are the same sidewall panel.

In some aspects of the disclosure, the latch box comprises a tunnel adapted to enable the latch arm of the second adjacent sidewall panel to pass through the latch box.

In some aspects of the disclosure, the latch box further comprises a ridge adapted to cooperatively engage a corresponding indent in the latch arm of the second adjacent sidewall panel.

In some aspects of the disclosure, the tunnel is formed by a latch box top, a latch box base, and latch box sidewalls.

In some aspects of the disclosure, the ridge is spaced farther apart from the second vertical edge than the interior edge of the latch box top.

In some aspects of the disclosure, the sidewall panel further comprises a bracket with a hole adapted to cooperatively engage a dowel protruding from a base of the barrel cooler.

In another aspect of the disclosure, a system of parts adapted to be coupled together to form a barrel cooler is provided. The system of parts comprises a base and a plurality of sidewall panels, each sidewall panel adapted to be coupled to the base and adapted to be coupled to an adjacent sidewall panel. Each of the plurality of sidewall panels comprises a latch arm protruding from a first vertical edge of the sidewall panel, wherein the latch arm is adapted to cooperatively connect with a latch box of a first adjacent sidewall panel of the barrel cooler. Each of the plurality of sidewall panels further comprises a latch box flush along a second vertical edge of the sidewall panel, wherein the latch box is adapted to cooperatively connect with a latch arm of a second adjacent sidewall panel of the barrel cooler. The system of parts also comprises a liner adapted to couple to the plurality of sidewall panels and configured to hold a number of articles. The system of parts further comprises a lid adapted to be hingedly connected to the liner and a plurality of wheels adapted to be coupled to the base.

In a further aspect of the disclosure a barrel cooler is provided. The barrel cooler comprises a base and a plurality of sidewall panels, each sidewall panel coupled to the base and coupled to an adjacent sidewall panel. Each of the plurality of sidewall panels comprises a latch arm protruding from a first vertical edge of the sidewall panel, wherein the latch arm is cooperatively connected with a latch box of a first adjacent sidewall panel of the barrel cooler. Each of the plurality of sidewall panels also comprises a latch box flush along a second vertical edge of the sidewall panel, wherein the latch box is cooperatively connected with a latch arm of a second adjacent sidewall panel of the barrel cooler. The barrel cooler also comprises a liner coupled to the plurality of sidewall panels and configured to hold a number of articles. The barrel cooler further comprises a lid hingedly connected to the liner and a plurality of wheels coupled to the base.

These and other aspects, objects, features and advantages will be more clearly understood and appreciated from a review of the following detailed description and appended claims, and by reference to the accompanying pictures and drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
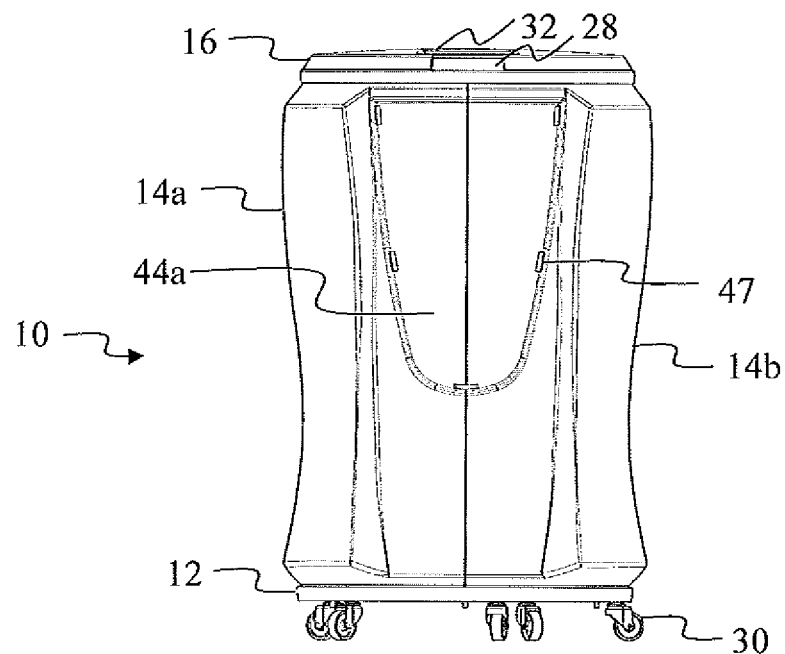
FIG. 1 is a front view of a barrel cooler according to some aspects of the disclosure.
Figure 2:
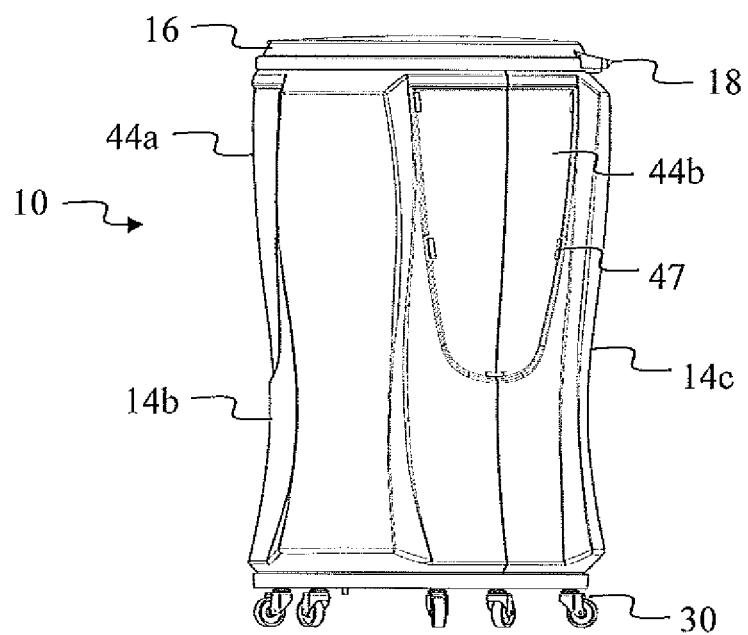
FIG. 2 is a right side view of the barrel cooler of FIG. 1.
Figure 3:
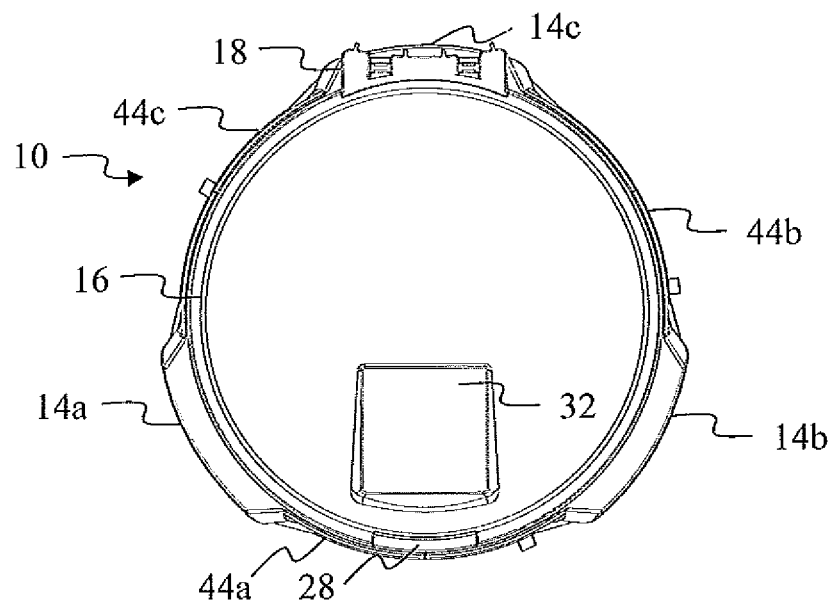
FIG. 3 is a top view of the barrel cooler of FIG. 1.

It should be understood at the outset that although an illustrative implementation of one or more embodiments are provided below, the disclosed systems and/or methods may be implemented using any number of techniques, whether currently known or hereafter learned. The disclosure should in no way be limited to the illustrative implementations, drawings, and techniques illustrated below, including the exemplary designs and implementations illustrated and described herein, but may be modified within the scope of the appended claims along with their full scope of equivalents.

Various aspects of the disclosure provide a barrel cooler that can be transported unassembled and quickly assembled on site. Because the barrel cooler can be transported unassembled, transportation costs for the barrel cooler can be reduced.

The barrel cooler may comprise, among other components, a plurality of sidewall panels. Each sidewall panel is adapted to be removably connected to an adjacent sidewall panel. The connected sidewall panels form a closed upright sidewall of the barrel cooler. When unassembled, the plurality of sidewall panels may nest within one another or otherwise stack together during shipping. Such nesting or stacking of the sidewall panels reduces a size of the package being shipped, hence reducing the transportation costs for the barrel cooler. In some aspects of the disclosure, each of the sidewall panels may be substantially identical or symmetric with the other sidewall panels.

The sidewall panels may be removably connected to each other through cooperation of a latch arm on a sidewall panel, a latch box on an adjacent sidewall panel, and a lip or ridge on the adjacent sidewall panel. The latch arm may comprise an indent towards a distal end thereof that cooperatively engages the ridge on the adjacent sidewall panel. The latch arm on the sidewall panel may be inserted through the latch box of the adjacent sidewall panel until the indent on the latch arm engages with the ridge.

Referring to FIGS. 1-4, a barrel cooler 10 has a base 12. A left sidewall panel 14a, a right sidewall panel 14b, a rear sidewall panel 14c (collectively referred to as sidewall panels 14) are disposed atop the base 12 and a lid 16 is connected to the barrel cooler 10 with a hinge 18. The barrel cooler 10 contains a liner 20 adapted to hold a number of articles. In some aspects of the disclosure the liner is adapted to hold articles, such as beverage containers, and ice. A plurality of casters or wheels 30, are attached to base 12 for mobility and vertical stability of the barrel cooler 10. In some aspects of the disclosure there are five or more wheels 30.

In some aspects of the disclosure, the assembled barrel cooler 10 may include a front display panel 44a, a right side display panel 44b, and a rear display panel 44c (collectively referred to as display panels 44). In some aspects of the disclosure, more or fewer display panels 44 may be present on the barrel cooler 10. Each of the display panels 44 is formed by a portion of two adjacent and connected sidewall panels 14. Each of the display panels 44 may also include a plurality of tabs 47. The tabs 47 may be adapted to hold poster or paper board inserts (not shown) within the display panels 44. Therefore, advertising materials or other display items may be inserted into the display panels 44 and be held in place by tabs 47.

Figure 9:
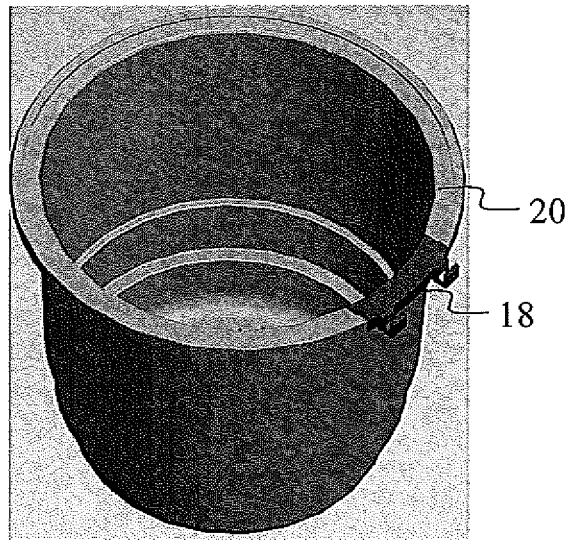
FIG. 9 is a perspective view of a liner of a barrel cooler according to some aspects of the disclosure.

The liner 20 may include a lip 22 that cooperatively engages with a rim 24 on the top of the sidewall panels 14. Therefore, when assembled, the liner 20 hangs from the sidewall panels 14 and is contained within the barrel cooler 10. Other configurations for installing a liner 20 within a barrel cooler 10 would be readily recognized by one of ordinary skill in the art and are within the scope of this disclosure. As best shown in FIG. 9, in some aspects of the disclosure, the hinge 18 may be integrally formed as part of the liner 20.

The liner 20 may include a drain 26 for draining melt water from the liner 20. The drain 26 may protrude from a bottom surface of the liner 20. In some aspects of the disclosure, the bottom surface of the liner 20 may be contoured to direct melt water towards the drain 26.

Figure 10:
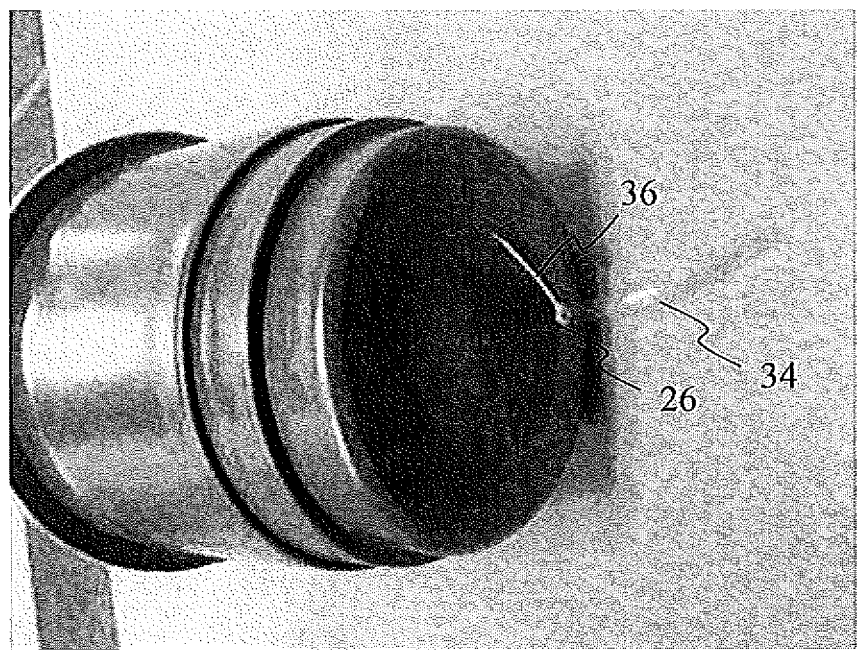
FIG. 10 is a bottom perspective view of a liner of a barrel cooler according to some aspects of the disclosure.
Figure 11:
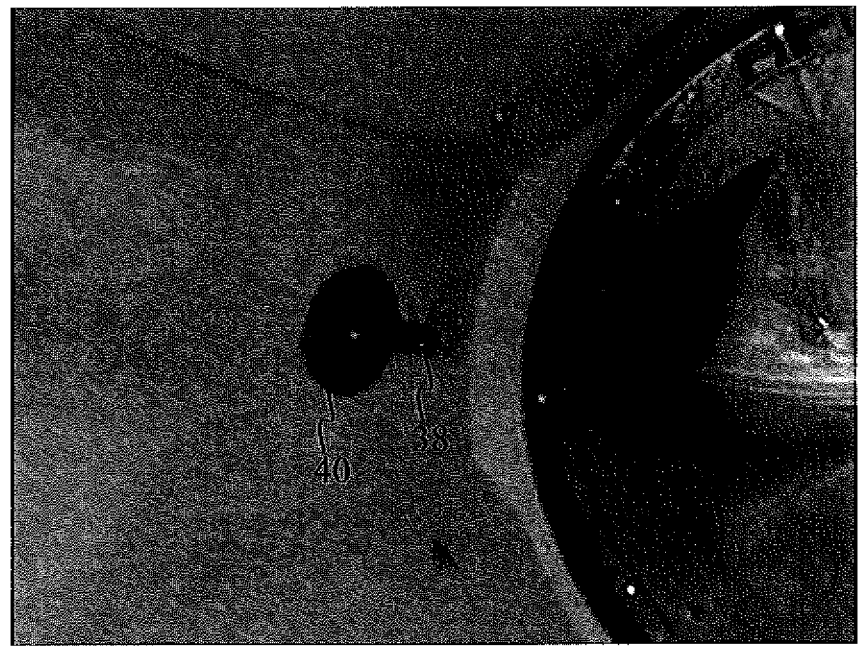
FIG. 11 is an interior perspective view of a sidewall panel with a drain of a barrel cooler according to some aspects of the disclosure.
Figure 12:
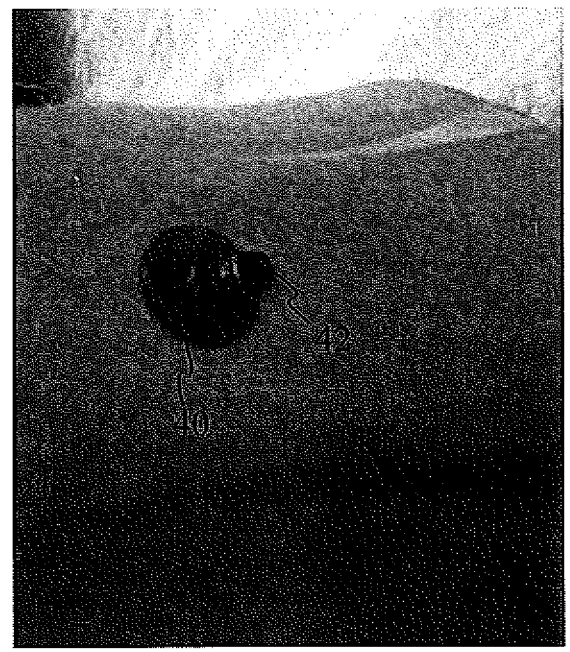
FIG. 12 is an exterior perspective view of a sidewall panel with a drain of a barrel cooler according to some aspects of the disclosure.

As shown in FIGS. 10-12, a drain tube 34 may have one end attached to the drain 26. In some aspects of the disclosure, a clamp or a tie 36 may fixedly hold the drain tube 34 to the drain 26. In other aspects of the disclosure, the drain tube 34 may simply be frictionally held to the drain 26. The other end of the drain tube 34 may be attached to an interior end 38 of a sidewall panel drain 40. The sidewall panel drain 40 may be installed in one of the sidewall panels 14, such as rear sidewall panel 14c. Therefore, melt water may drain from the drain 26 in the liner 20 through the drain tube 34 to the interior end 38 and on out of the exterior end 42 of the sidewall panel drain 40.

The lid 16 may be rotated upwards about the hinge 18 by a handle or handhold 28 to provide access to containers held by the liner 20 inside the barrel cooler 10. In some aspects of the disclosure, the lid 16 is transparent such that containers are visible through without opening the lid 16. Because the containers are visible without opening the lid 16, less time is spent with the lid 16 opened to select a desired container, which prolongs the life of the ice inside the barrel cooler 10. The lid 16 may also include a window 32. In some aspects of the disclosure, only the window 32 within the lid 16 is transparent. In some aspects of the disclosure, the lid 16 may be fully or partially insulated, have one or more seals, or include further features known to those skilled in the art to improve the insulation properties of the lid—thereby further extending the life of the ice.

Figure 5:
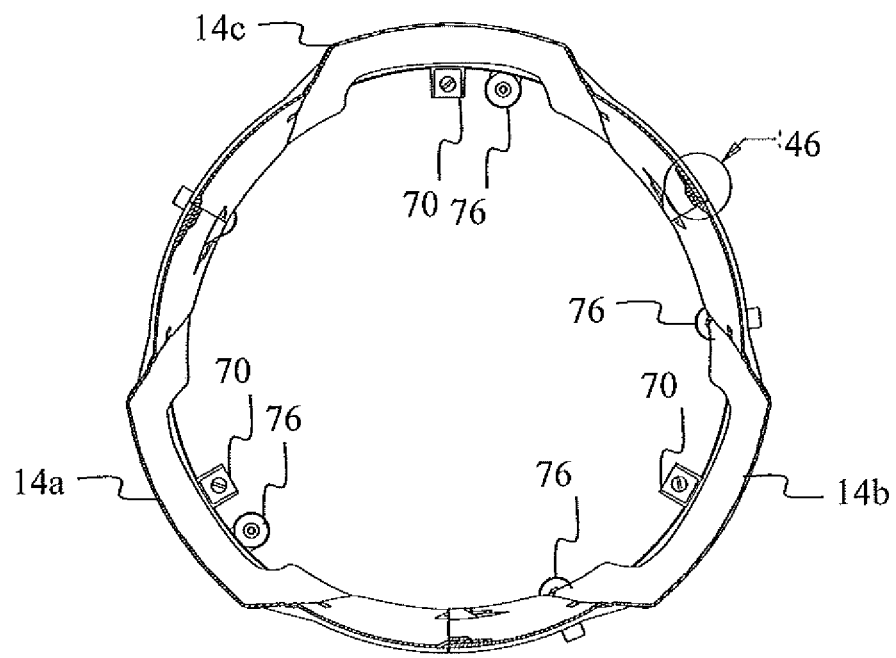
FIG. 5 is a top view of assembled sidewall panels of a barrel cooler according to some aspects of the disclosure.
Figure 6:
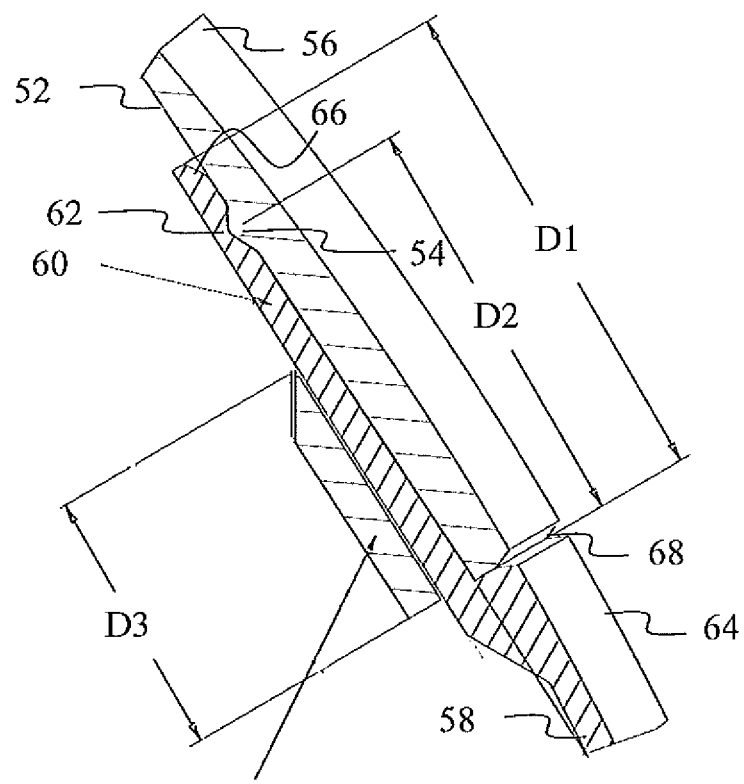
FIG. 6 is a cross-sectional view at an attachment point of the assembled sidewall panels of the barrel cooler of FIG. 5.
Figure 7:
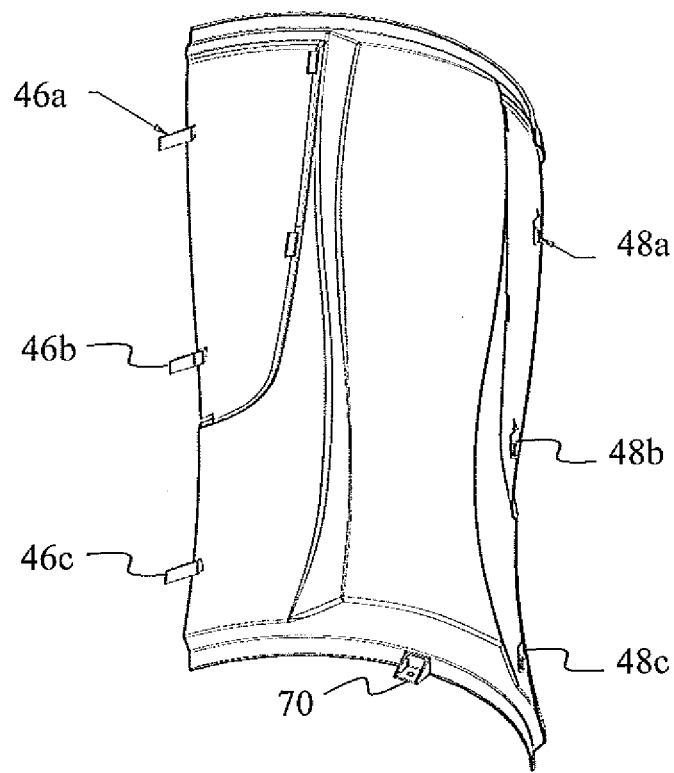
FIG. 7 is a perspective view of a sidewall panel of a barrel cooler according to some aspects of the disclosure.

Referring to FIGS. 4-8, the sidewall panels 14 include a plurality of features that facilitate the assembly of the barrel cooler 10. Each of the sidewall panels 14 include a top latch arm 46a, a middle latch arm 46b, and a bottom latch arm 46c (collectively referred to as latch arms 46) that protrude from a vertical edge of a body of the sidewall panel. Each of the sidewall panels also includes a top latch box 48a, a middle latch box 48b, and a bottom latch box 48c (collectively referred to as latch boxes 48) flush along a vertical edge of the body of the sidewall panel opposite that of the latch arms 46. As best shown in FIG. 7, each of the latch arms 46 is placed at the same vertical location along the vertical edges of the sidewall panels 14 as the corresponding latch boxes 48.

In some aspects of the disclosure there may be more or fewer latch arms 46 and latch boxes 48. However, for each of the latch arms 46 protruding from a vertical edge of a sidewall there is a corresponding one of the latch boxes 48 on an opposite vertical edge of the sidewall panel than the latch arms 46.

As best shown in the cross-sectional view of FIG. 6, the latch arms 46 and the latch boxes 48 cooperatively couple together to connect adjacent sidewall panels 14. The latch boxes 48 each include a latch box top 50 and a latch box base 52 coupled to the exterior cladding 56 of one of the sidewall panels 14. The latch box top 50 has a length D3 as measured from the vertical edge 68 of a sidewall panel. The latch box base 52 includes a ridge 54 spaced farther apart from a vertical edge 68 of the sidewall panel than the interior end of the latch box top 50. The ridge 54 may be a distance D2 from the vertical edge 68 of the sidewall panel. The latch box top 50 and the latch box base 52 are coupled together by latch box sidewalls (not shown in FIG. 6) so as to form a tunnel through which a latch arm may pass. In other words, the tunnel is adapted to enable the latch arm to pass through the latch box. The latch box base 52 may be coupled to the sidewall cladding 56 by any means known to those skilled in the art, such as by welding, gluing, tacking, taping, nailing, riveting, or screwing.

The latch arms 46 each include a latch arm base 58, a latch arm 60, an indent 62 towards or adjacent to a distal end of the latch arm 60, and an upwardly sloped end 66. The latch arm base 58 may be coupled to the sidewall cladding 64 of the adjacent sidewall panel by any means known to those skilled in the art, such as by welding, gluing, tacking, taping, nailing, riveting, or screwing.

The indent may be a distance D2 from the vertical edge 68 of the sidewall panel. The indent 62 is shaped and located along the latch arm 60 so as to cooperatively engage the ridge 54 of the latch box base 52. The upwardly sloped end 66 of the latch arm 60 facilitates flexing of the latch arm 60 as the distal end of the latch arm 60 is pushed up and over the ridge 54. The upwardly sloped end 66 of the latch arm 60 may be a distance D1 from the vertical edge 68 of the sidewall panel. It is noted that distance D1 is greater than distance 02, which is in turn greater than distance D3. Once adjacent sidewall panels 14 are coupled together through engagement of the ridge 54 with the indent 62, the latch box top 50 maintains the engagement of the ridge 54 with the indent 62. That is, the latch box top 50 resists the latch arm 60 from moving away from the latch box base 52.

Figure 8:
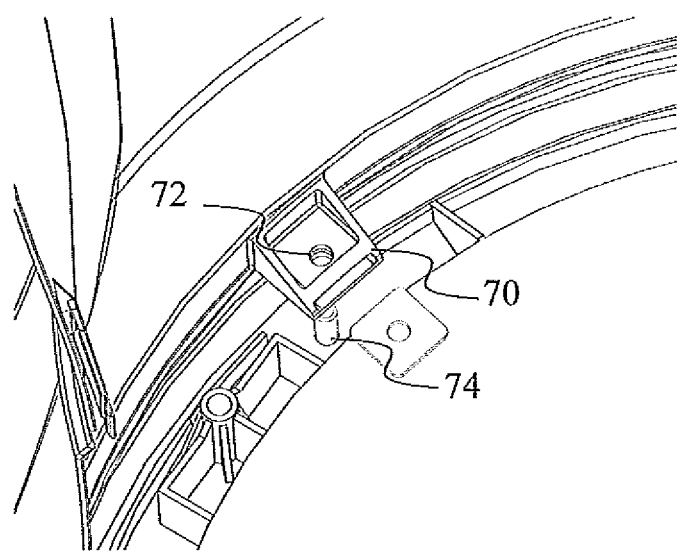
FIG. 8 is a perspective view of an interior attachment point between a sidewall panel and a base of a barrel cooler according to some aspects of the disclosure.

Each of the sidewall panels 14 may also include a bracket 70 that connects the sidewall panels 14 to the base 12. As shown in FIG. 8, according to some aspects of the disclosure, the bracket 70 may include a hole 72 that engages with a dowel 74 of the base 12. That is, when assembled, the dowel 74 protrudes upwards from the base 12 and through the hole 72 of the bracket 70.

Each of the sidewall panels 14 may also include one or more wheel attachments 76, best seen in FIG. 5. The wheel attachments 76 may engage with a distal end of an attachment shaft (not shown in FIG. 5) of the wheels 30. In some aspects of the disclosure the attachment shaft of the wheels 30 may attach to both the base 12 and the wheel attachments 76.

Figure 4:
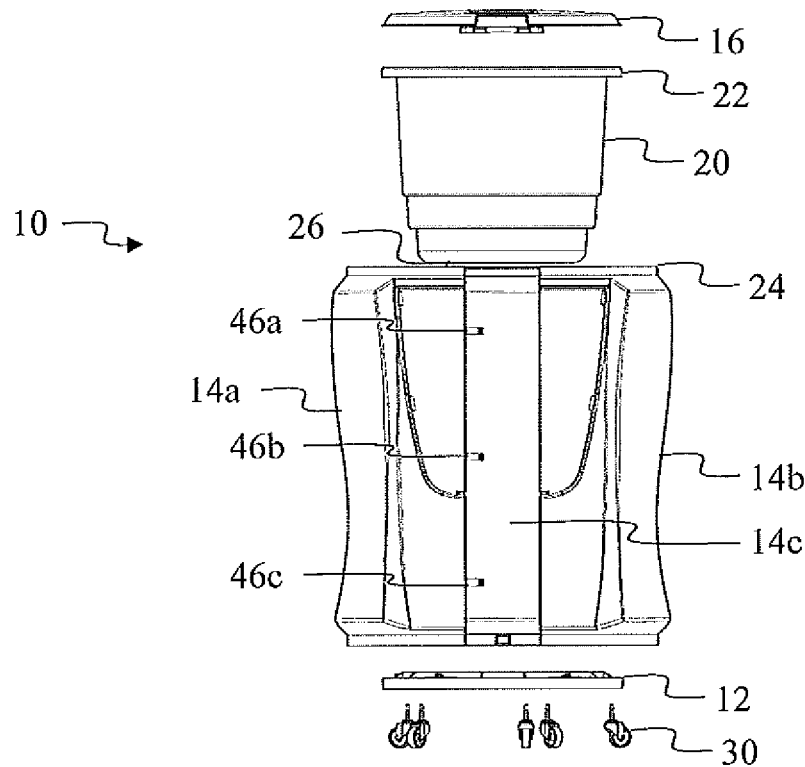
FIG. 4 is an exploded view of the barrel cooler of FIG. 1.

As shown in FIG. 4, each of the components of the barrel cooler 10 may be maintained as unassembled parts of the barrel cooler 10. In other words, the parts of the barrel cooler 10 may form a system of parts adapted to be coupled together to form the barrel cooler. When unassembled, the parts of the barrel cooler 10 may be packaged together into one or more packages and shipped to a destination. Upon receipt of the one or more packages at the destination, the parts of the barrel cooler 10 may then be assembled together as described above to form the barrel cooler 10.

As is evident from the foregoing description, certain aspects of the disclosure are not limited to the particular details of the examples illustrated in FIGS. 1-12, and it is therefore contemplated that other modifications and applications will occur to those skilled in the art. For example, while the above exemplary barrel coolers illustrated in FIGS. 1-12 include three sidewall panels that cooperatively connect together to form the barrel cooler, other numbers of sidewall panels are contemplated by this disclosure. For example, there may be two, four, five, ten, or more sidewall panels that cooperatively connect together to form the barrel cooler.

While several aspects of the disclosure have been provided above, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

ELEMENT LIST 10 barrel cooler
12 base
14a left sidewall panel
14b right sidewall panel
14c rear sidewall panel
14 sidewall panels
16 lid
18 hinge
20 liner
22 lip
24 rim
26 drain
28 handle or handhold
30 wheels
32 window
34 drain tube
36 tie
38 interior end
40 sidewall panel drain
42 exterior end
44a front display panel
44b right side display panel
44c left side display panel
44 display panels
46a top latch arm
46b middle latch arm
46c bottom latch arm
46 latch arms
47 tabs
48a top latch box
48b middle latch box
48c bottom latch box
48 latch boxes
50 latch box top
52 latch box base
54 ridge
56 cladding
58 latch arm base
60 latch arm
62 indent 64 cladding
66 sloped end
68 vertical edge
70 bracket
72 hole
74 dowel
76 wheel attachment

What is claimed is:

1. A sidewall panel of a barrel cooler, comprising:
a sidewall panel body forming a first vertical edge and a second vertical edge;
a latch arm protruding from the first vertical edge of the sidewall panel body, wherein the latch arm is adapted to cooperatively and removably connect with a latch box of a first adjacent sidewall panel of the barrel cooler; and
a latch box flush along the second vertical edge of the sidewall panel body, wherein the latch box is adapted to cooperatively and removably connect with a latch arm of a second adjacent sidewall panel of the barrel cooler.

2. The sidewall panel of claim 1, wherein the latch arm comprises an indent adjacent to a distal end of the latch arm.

3. The sidewall panel of claim 2, wherein the indent of the latch arm is shaped to cooperatively engage a corresponding ridge of the latch box of the first adjacent sidewall panel.

4. The sidewall panel of claim 3, wherein the latch arm further comprises a sloped end that is adapted to facilitate flexing of the latch arm up and over the corresponding ridge.

5. The sidewall panel of claim 1, wherein the first adjacent sidewall panel and the second adjacent sidewall panels are the same sidewall panel.

6. The sidewall panel of claim 1, wherein the latch box comprises a tunnel adapted to enable the latch arm of the second adjacent sidewall panel to pass through the latch box.

7. The sidewall panel of claim 6, wherein the latch box further comprises a ridge adapted to cooperatively engage a corresponding indent in the latch arm of the second adjacent sidewall panel.

8. The sidewall panel of claim 7, wherein the tunnel is formed by a latch box top, a latch box base, and latch box sidewalls.

9. The sidewall panel of claim 8, wherein the ridge is spaced farther apart from the second vertical edge than the interior edge of the latch box top.

10. The sidewall panel of claim 1, further comprising a bracket with a hole adapted to cooperatively engage a dowel protruding from a base of the barrel cooler.

11. A system of parts adapted to be coupled together to form a barrel cooler, comprising:
a base;
a plurality of sidewall panels, each sidewall panel adapted to be coupled to the base and adapted to be coupled to an adjacent sidewall panel, wherein each of the plurality of sidewall panels comprises:
a latch arm protruding from a first vertical edge of the sidewall panel, wherein the latch arm is adapted to cooperatively connect with a latch box of a first adjacent sidewall panel of the barrel cooler, and
a latch box flush along a second vertical edge of the sidewall panel, wherein the latch box is adapted to cooperatively connect with a latch arm of a second adjacent sidewall panel of the barrel cooler;
a liner adapted to couple to the plurality of sidewall panels and configured to hold a number of articles;
a lid adapted to be hingedly connected to the liner; and
a plurality of wheels adapted to be coupled to the base.

12. The system of parts of claim 11, wherein the latch arm comprises an indent adjacent to a distal end of the latch arm.

13. The system of parts of claim 12, wherein the indent of the latch arm is shaped to cooperatively engage a corresponding ridge of the latch box of the first adjacent sidewall panel.

14. The system of parts of claim 11, wherein the latch box comprises a tunnel adapted to enable the latch arm of the second adjacent sidewall panel to pass through the latch box.

15. The system of parts of claim 14, wherein the latch box further comprises a ridge adapted to cooperatively engage a corresponding indent in the latch arm of the second adjacent sidewall panel.

16. The system of parts of claim 15, wherein the tunnel is formed by a latch box top, a latch box base, and latch box sidewalls.

17. The system of parts of claim 16, wherein the ridge is spaced farther apart from the second vertical edge than the interior edge of the latch box top.

18. The system of parts of claim 17, wherein the base comprises a dowel protruding upwards from the base, and wherein each of the sidewall panels further comprise a bracket with a hole adapted to cooperatively engage the dowel.

19. A barrel cooler, comprising:
a base;
a plurality of sidewall panels, each sidewall panel coupled to the base and coupled to an adjacent sidewall panel, wherein each of the plurality of sidewall panels comprises:
a latch arm protruding from a first vertical edge of the sidewall panel, wherein the latch arm is cooperatively connected with a latch box of a first adjacent sidewall panel of the barrel cooler, and
a latch box flush along a side vertical edge of the sidewall panel, wherein the latch box is cooperatively connected with a latch arm of a second adjacent sidewall panel of the barrel cooler;
a liner coupled to the plurality of sidewall panels and configured to hold a number of articles;
a lid hingedly connected to the liner; and
a plurality of wheels coupled to the base.

20. The barrel cooler of claim 19, wherein the latch arm comprises an indent adjacent to a distal end of the latch arm that is cooperatively engaged with a corresponding ridge of the latch box of the first adjacent sidewall panel.

* * * * *